United States Patent Office 3,534,088
Patented Oct. 13, 1970

3,534,088
SYNTHESIS OF OCTYL ESTERS AND ALCOHOLS
David R. Bryant and James E. McKeon, South Charleston, W. Va., assignors to Union Carbide Corporation, a corporation of New York
No Drawing. Filed Aug. 14, 1967, Ser. No. 660,226
Int. Cl. C07c 67/04
U.S. Cl. 260—497                                   8 Claims

ABSTRACT OF THE DISCLOSURE

Octanols, useful for making plasticizers, are synthesized from butadiene by reacting butadiene with acetic acid in the presence of palladium catalysts to form octadienyl acetates, which are hydrogenated and hydrolyzed to form the octanols. The octadienyl acetates formed are new compounds. To form the octadienyl esters from butadiene, it is necessary to operate in the absence of catalytic co-oxidants, such as copper.

This invention relates to a method for making octyl esters and alcohols, and to a method for making octadienyl esters useful as intermediates for making octyl esters and alcohols.

Octyl alcohols are useful as intermediates for making plasticizers, such as dioctyl phthalate which is widely used as a plasticizer for vinyl resins. 2-ethylhexanol is the octyl alcohol most commonly used industrially for this purpose. However, n-octyl alcohol would be preferable for this plasticizer use because plasticizers made from them are somewhat superior in their effectiveness. However, as of now, there is no readily available commercial synthesis for n-octanol. The Zeigler synthesis of alcohols from ethylene gives a mixture of products of varying chain length, and heptene-1 required for an Oxo synthesis of octanols is not readily available and, furthermore, the Oxo processes also produce branched-chain alcohols.

According to this invention, it has been found that under appropriate catalytic conditions butadiene and carboxylic acid, such as acetic acid, will react to form an octadienyl ester. This unsaturated ester is then hydrogenated and hydrolyzed to form n-octanol. The reaction is carried out with good efficiencies, and since butadiene is cheap and readily available, an economic synthesis of octanol is provided, since the hydrogenation and hydrolysis steps are carried out in high yields and efficiencies. Acetic acid formed in the hydrolysis step can be recycled to react with butadiene, so the process is selfsufficient in acetic acid requirements.

The catalytic reaction of butadiene with acetic acid to form an octadienyl acetate is an important part of this invention. The reaction is catalyzed with palladium, or other Group VIII noble metal catalysts, such as platinum, which form complexes with butadiene leading to its simultaneous dimerization and reaction with acetic acid to form an octadienyl acetate. Although palladium in many forms can be used, palladium chloride alone cannot be used. In the presence of palladium chloride alone, butadienyl monoacetate is claimed as the predominant product (E. W. Stern and M. L. Spector, Proc. Chem. Soc. 1961, 370). The simultaneous dimerization of butadiene and reaction with acetic acid to form octadienyl acetate in the presence of palladium catalysts other than the chloride is quite unexpected. Thus, Smidt has reported (J. Smidt, Chem. Ind., 1962, 54) that butadiene in a palladium chloride containing aqueous system reacts to form 3-ketobutyraldehyde. By analogy, therefore, the expected reaction of anhydrous acetic acid and palladium acetate would be the formation of 1,3-butadien-1,3-diol diacetate. On the contrary, however, in the presence of palladium acetate, butadiene and acetic acid react to form the octadienyl acetate with only minor amounts of 4-carbon atom esters formed, and these are the monolefinic butenyl esters, instead of the diolefinic esters previously reported.

The octadienyl acetates obtained by the process of this invention are primarily the trans with small amounts of the cis isomer of 2,7-octadien-1-ol acetate. However, upon hydrogenation and hydrolysis both the trans and cis isomer are converted to n-octanol. In addition to these products, there is a considerable amount of another 8-carbon acetate formed, 1,7-octadiene-3-ol acetate. Upon hydrogenation and hydrolysis, this acetate is converted to the secondary alcohol, octanol-3. This alcohol can be separated from the n-octanol formed and used to form octyl acrylate for making polymers, or plasticizers can be obtained from the mixed alcohols by reaction with phthalic anhydride.

In addition to the above esters from 8-carbon alcohols, small amounts of esters from 12-carbon unsaturated alcohols were formed. As previously mentioned, only small amounts of the 4-carbon butenyl esters are found. The reaction also produces a small quantity of the unusual butadiene dimer, 1,3,7-octatriene. Only small amounts of the conventional thermal dimerization product, vinyl cyclohexene, are found.

In contrast to the reactions of ethylene, propylene and other mono-olefinic palladium complexes which reduce palladium(II) stoichiometrically and are catalytic only when used with a copper(II)-oxygen co-oxidant system, the butadiene reactions of this invention represent true catalysis by palladium. Thus, no metallic palladium is deposited during the course of the reaction. In the absence of palladium, neither 1,3,7-octatriene nor the octadienyl acetates are found, only thermal dimerization products (vinyl cyclohexene) are observed.

Since the process of this invention represents true catalysis by palladium, any active form of palladium may be used as a catalyst. Although palladium chloride cannot be used alone as a catalyst, as previously mentioned, it can be used if large quantities of acetate ion are also present.

When the novel process is conducted as a hemogeneous, liquid phase reaction, the active catalyst species can be derived from a palladium compound which is soluble in the reaction mixture or which can become soluble therein by reaction with one of the components of said mixture. Illustrative palladium compounds which may be used include palladium(II) alkanoates, e.g., palladium(II) acetate, palladium(II) propionate, palladium(II) butyrate, palladium(II) hexanoate, and the like; the palladium(II) cycloalkanecarboxylates, e.g., palladium(II) cyclohexanecarboxylate, and the like; palladium(II) aryl carboxylates, e.g. palladium(II) benzoate, palladium(II) monomethyl phthalate and the like; olefin complexes of palladium, 1,5-cyclooctadiene palladium(II) chloride, π-allylpalladium acetate, endo-dicyclopentadienepalladium (II) bromide and the like; complexes with alkyl and aryl nitriles, e.g., bis(benzonitrile)-palladium(II) chloride, bis(propionitrile)palladium(II) cyanide, and the like; palladium(II) bromide, palladium(II) nitrate, palladium(II) sulfate, palladium(II) acetylacetonate, ammonium chloropalladate, ammonium chloropalladite, potassium bromopalladite dichlorodiaminepalladium(II), dinitritoaminepalladium(II), potassium chloropalladate, potassium chloropalladite, sodium chloropalladite, and the like; complexes of palladium with trihydrocarbylphosphines and arsines, e.g., bis(triphenylphosphine) palladium(II) acetate, tetrakis(triphenylphosphine)palladium(0), tetrakis(dimethylphenylphosphine)palladium (0), bis(triphenylphosphine)palladium(II) nitrate, bis-(triphenylarsine)palladium(II) chloride, bis(dimethylphenylphosphine)palladium(II) chloride, bis(tributylarsine)palladium(II)bromide, bis(trioctylphosphine)palladium(II)-nitrate and the like; complexes with phosphates and phosphites, e.g., bis(trioctylphosphite)palladium(II) nitrate; bis(triphenylphosphate)palladium(II) chloride and the like; complexes with bidenate ligands of the types outlined above may also be used.

Palladium metal in an active form such as palladium black or palladium on a support, such as charcoal, may be used as the source of the catalytic palladium species. Palladium complexes can be generated in situ by reaction of such active forms of palladium with species such as allyl bromide (to give $\pi$-allylpalladium bromide) or trihydrocarbyl phosphines.

For the sake of brevity this descriptive list has been limited to compounds of palladium. Analogous compounds of platinum are well known and are also effective as catalysts in this process.

The catalyst is employed in catalytically significant quantities. A catalyst concentration in the range from about 0.00001 molar and lower, to about 1 molar, and higher is suitable. A catalyst concentration in the range from about 0.0001 to about 0.1 molar is preferred. For optimum results the nature of the reactants, the operative conditions under which the reaction is conducted, the solvent characteristics of the carboxylic acid (and inert, normally liquid organic diluent, if employed), and other factors, will largely determine the desired catalyst concentration.

The reaction can be conducted with the catalyst absorbed on a solid support, e.g., silica, alumina, silica-alumina, asbestos, activated carbon, and the like. The supported catalyst may be used as a heterogeneous catalyst in a liquid phase reaction, in a trickling phase reactor, in which one or more of the reactants may be introduced as a gas, and if the physical properties of all the components of the reaction mixture are suitable, it may be used in a gas phase reaction. The amount of catalyst on the support can be varied over a wide range, e.g., from 0.0001 to 10 weight percent of the catalyst based on the weight of the catalyst and support.

While this reaction may be carried out starting with, for example, palladium acetate in acetic acid, higher yields, improved selectivity and catalyst stability are achieved by the addition of a source of acetate ions. In general the presence of a source of carboxylate anion in addition to the carboxylic acid itself is beneficial. In cases where palladium is added as a halide compound the presence of an additional source of carboxylate ions is critical to the success of the process.

Suitable sources of additional carboxylate ions are provided by a soluble ionic carboxylate compound. For instance, a soluble ionic carboxylate compound can be added to the reaction medium, or it can be generated in situ by the reaction of a basic compound with the carboxylic acid reagent, providing that the neutralization product (from the reaction of said basic compound and said acid) does not interfere with the alkenylation reaction, or if said neutralization product does interfere it is capable of being readily removed from the reaction medium. The basic salts of a strong base and a weak acid, the metal portion of said salts being capable of forming a soluble carboxylate salt in the carboxylic acid reagent, are preferred for providing the additional carboxylic acid anion source. Illustrative basic salts include the alkali metal hydroxides and oxides, e.g., sodium hydroxide, potassium hydroxide, and the like; the Group II metal hydroxides, e.g., barium hydroxide, hydroxide, magnesium hydroxide, calcium hydroxide, and the like; the metal salts of carboxylic acids, the acid moiety of which corresponds, preferably to the anion of the carboxylic acid reagent, e.g., the alkali metal carboxylates such as sodium acetate, potassium acetate, lithium acetate, potassium propionate, sodium propionate, and the like; the Group II metal carboxylates such as barium acetate, zinc acetate, magnesium acetate, cadmium acetate, zinc propionate, and the like. Further illustrative basic compounds which are capable of providing the source or means of additional carboxylic acid anion include ammonia; the alkali metal carbonates and oxides, e.g., sodium carbonate, sodium oxide, potassium carbonate, potassium oxide, and the like; the ammonium carboxylates such as the ammonium alkanoates, e.g., ammonium acetate, ammonium propionate, and the like; the alkaline earth metal oxides and carbonates; the basic organic nitrogen compounds such as the trialkylamines, e.g., trimethylamine, triethylamine, and the like. Moreover, the additional carboxylic acid anion can be supplied by carboxylate for the catalyst. For example, if acetic acid is the reagent, the source of additional acetate anion can be supplied by the acetate of the catalyst, e.g., palladous acetate. Lithium, sodium, potassium cesium, ammonium and magnesium carboxylates are especially preferred.

As previously mentioned, the reaction of butadiene with acetic acid according to the present invention is fundamentally different from the olefin-acetic acid reactions described in U.S. Pat. No. 3,211,045 issued to J. E. McKeon and P. S. Starcher, and the only similarity is in the reference to palladium catalysts and the alkali-metal salts. Thus, the presence of a catalytic co-oxidant, i.e., Cu(II), is not necessary for the butadiene dimerization reaction of the present invention, and if present, greatly favors the formation of butenyl esters, rather than the octadienyl esters.

The butadiene dimerization and addition reaction of this invention differs from that described in U.S. Pat. No. 3,221,045, not only in that catalytic co-oxidant is not needed in the process of this invention, but also in that the reactions of this invention are carried out under non-oxidizing conditions and no water is produced in the process. For example, the reaction of ethylene, oxygen, and acetic acid to produce vinyl acetate may be written as follows:

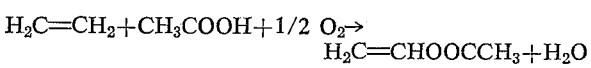

$H_2C{=}CH_2+CH_3COOH+1/2\ O_2 \rightarrow$
$\qquad H_2C{=}CHOOCCH_3+H_2O$

On the other hand, the butadiene reaction of this invention may be represented as follows:

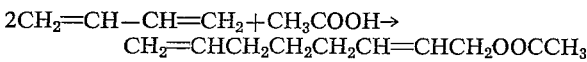

$2CH_2{=}CH{-}CH{=}CH_2+CH_3COOH \rightarrow$
$\qquad CH_2{=}CHCH_2CH_2CH_2CH{=}CHCH_2OOCCH_3$ As shown in the equations above, all the hydrogen atoms present in the two molecules of butadiene and the molecule of acetic acid appear in the final octadienyl acetate; none is oxidized to water.

As previously mentioned, it is important to carry out the reaction under non-oxidizing conditions. Oxygen is not required to support the butadiene dimerization and addition reaction of this invention, but is also deleterious, if present in significant amounts. Thus, in the presence of oxygen, the starting 1,3-dienes readily form peroxides, as do the octadienyl ester products. Such peroxides lead to undesired radical induced polymerizatiton reactions, and resulting low yields, if any, of the desired products.

While any one of the palladium or platinum compounds previously described can be used as catalysts, improved results can be obtained by the addition of catalyst modifiers.

The modifiers can be selected from the trihydrocarbyl phosphines (the trialkylphosphines; e.g., tri-n-octylphosphine, tributylphosphine, dimethyl-n-octylphospine and the like; triarylphosphine, e.g., triphenylphosphine, tritolylphosphine, and the like; the tertiary alkarylphosphine, e.g. diphenylethylphosphine, dimethylphenylphosphine, bis (diphenylphosphino)methane, 1,2 - bis(diphenylphosphino)ethane and the like, the trihydrocarbylarsines (the trialkyl, triaryl and alkaryl arsines illustrated by substitution of As for P in the compounds described above) and the trihydrocarbylphosphites (trialkyl phosphites, e.g., triethylphosphite, tributylphosphite, tri(2-ethylhexyl)phosphite and the like; triarylphosphites, e.g., triphenylphosphite, tri(p - chlorophenyl)phosphite, tri(1-naphthyl)phosphite and the like. Mixed alkylarylphosphites can be prepared and used. Because of the methods of syntheses and the relatively facile exchange of groups, it is difficult to prepare discrete compounds in high yield; the mixtures are suitable for use as modifiers if desired.

Because of considerations such as solubility, it may be advantageous to use mixtures of different hydrocarbyl-phosphines, for example or mixtures of phosphines and/or arsines and/or phosphites.

These modifiers may be added to the reaction mixture in quantities such that the ratio of the total number of moles of modifiers of all kinds (whether added as part of the palladium or platinum catalyst or added separately) to palladium or platinum, can vary, for example, from 200:1 and higher and 1:10 and lower, preferably from 100:1 to 1:1, most preferably 20:1 to 1:1.

The reaction of the present invention can be carried out by charging the palladium catalyst, together with alkali-metal acetate, if desired, and acetic acid to a suitable pressure-vessel and introducing butadiene to the vessel. The reaction can be carried out at temperatures of 20 −5° C. to 200° C., although the temperature of reaction is not a critical part of the invention. Preferred reaction temperatures are 20° C. to 180° C., most desirably from 50° C. to 150° C. The reaction can be carried out at autogeneous pressures, or higher if desired. After completion of the reaction, the organic products may be extracted with a light paraffin, such as pentane, and separated therefrom by distillation. The catalyst is recovered from the extraction step and recycled for further use.

The octadienyl acetates may be recovered from the other organic products and utilized directly or converted to octyl alcohols, as previously described. Thus, the octadienyl acetate may be converted to the corresponding epoxides by treatment with peracetic acid in known manner. The resulting epoxides are useful in making epoxy resins by reaction with hardeners, or as plasticizers and stabilizers for polyvinyl chloride.

Before conversion to octyl alcohols, the secondary and primary octadienyl acetate may be separated by distillation, and separately converted by hydrogenation and hydrolysis to n-octanol and octanol-3. Alternatively, separation of the octadienyl acetates before hydrogenation and hydrolysis is not required, and the final product is a mixture of n-octanol and octanol-3. These alochols may be separated, or used as mixtures for making mixed-phthalate ester plasticizers.

The hydrolysis of the octyl acetates resulting from the hydrogenation step is carried out by known methods, i.e., catalytic hydrolysis with acid catalysts, such as sulfuric acid or by saponification with caustic soda. In the first instance, weak acetic acid is formed which may be concentrated and returned to the butadiene reaction. In the second instance, the acetic acid is recovered as its sodium salt which is an article of commerce.

The carboxylic acids which are contemplated in the novel process contain at least one carboxy group, i.e., —COOH. Illustrative examples of carboxylic acids include the alkanoic acids such as acetic acid, chloroacetic acid, propionic acid, butyric acid, valeric acid, pivalic acid, hexanoic acid, heptanoic acid, decanoic acid, dodecanoic acid, and the like; the cycloalkanecarboxylic acids, e.g., cyclohexanecarnoxylic acid, cyclopentanecarboxylic acid, and the like; aromatic acids, such as benzoic acid; naphthoic acid; phenylacetic acid; and the like monocarboxylic acids with carbon-carbon unsaturation such as acrylic acid, butenoic acid, oleic acid, undecenoic acid, cinnamic acid, sorbic acid, and the like; half acid esters or half dialkyl amides of dicarboxylic acids; dicarboxylic acids such as malonic acid, adipic acid, azelaic acid, phthalic acid, isophthalic and/or terephthalic acid and the like.

In the reaction, butadiene may be replaced with other 1,3-dienes to form substituted octadienylesters. Suitable 1,3-dienes include isoprene, piperylene, chloroprene, and 1,3-hexadiene-1,3.

The hydrogenation of the octadienyl acetates to octyl acetates may be carried out in known manner by reacting the unsaturated ester with hydrogen under pressure in the presence of any of the usual hydrogenation catalysts, such as Raney nickel, platinum, copper-chrome oxides, rhodium, ruthenium, and palladium.

The following examples will serve to illustrate the invention:

EXAMPLE 1

Palladium acetate catalyst

To a 3–1. glass bomb liner was charged 45.9 grams of lithium acetate, 68.7 grams of potassium acetate, 300 grams of glacial acetic acid, and 1.00 gram of palladium (II) acetate. The liner and its contents were placed in a high pressure bomb and purged with nitrogen. Butadiene (100 grams) was charged from a tarred cylinder pressurized with nitrogen. The bomb was heated at 90° C. with rocking for 17 hours.

After venting the bomb and allowing it to stand for several hours, its weight was 99 grams heavier than when initially charged. The reaction mixture was a clear yellow solution. No palladium metal had precipitated or plated during the course of the reaction.

The reaction mixture was transferred to a continuous extractor, and the organic products were removed with pentane. A considerable amount of butadiene was evolved during the first portion of the extraction. The pentane extract was washed with water, then with saturated sodium bicarbonate solution before drying over anhydrous calcium sulfate (Drierite [1]). The pentane was removed on a spinning band column to give 60.2 grams of product. Fractionation of this mixture as achieved on a Nester-Faust spinning band column is summarized below:

| Fraction No. | Weight of fraction (in grams) | Boiling point, mm. |
|---|---|---|
| 3 | 2.8 | 51–58°/83 |
| 4 | 1.8 | 58–61°/83 |
| 5 | 3.3 | 61–62°/83 |
| 6 | 1.7 | 111–119°/8 |
| 7 | 8.0 | 119–123°/80 |
| 8 | 5.0 | 123–129°/79 |
| 9 | 1.7 | 129–135°/80 |
| 10 | 6.1 | 135–137°/79 |
| 11 | 21.2 | 134°/62 |
| 12 | 3.2 | 94°/13 |
| Pot | 5.4 | |

A sample of the crude product mixture before distillation was analyzed on a 20′ x 3/8″ 20 percent Versamid 900 on Chromosorb W [2] column at 160° C. Seven products were present in amount greater than 1 area percent on the vapor phase chromatograph chart. The product distribution observed was:

| Peak No. | Compound | Percentage |
|---|---|---|
| 1 | 3-buten-2-ol acetate | 2.59 |
| 2 | 1,3,7-octatriene | 7.07 |
| 3 | Trans-crotyl acetate | 2.08 |
| 4 | Vinylcyclohexene | 4.73 |
| 12 | 1,7-octadiene-3-ol acetate | 25.15 |
| 15 | Unidentified | 0.47 |
| 16 | do | 0.79 |
| 17 | Cis-2,7-octadiene-1-ol acetate | 8.73 |
| 18 | Trans-2,7-octadiene-1-ol acetate | 48.51 |

Each distillation cut was examined by vapor phase chromatograph on the Versamid column, and suitable cuts were selected for use in the preparative vapor phase chromatograph isolation of each product.

3-Buten-2-ol acetate.—Peak #1 was collected by preparative vapor phase chromatograph from distillation cut ---
[1] The W. A. Hammond Drierite Company, Xenia, Ohio.
[2] Chromosorb is Johns-Manville's trademark for diatomaceous silica developed for use as a gas chromatography support.

3. Identification was based on comparison of its infrared spectrum with that of known 3-buten-2-ol acetate. Identification was also substantiated by comparison of vapor phase chromatograph retention times with those of an authentic sample on various columns.

1,3,7-Octatriene.—Peak #2 was collected from distillation cuts #3 and #5. It was submitted for infrared, nuclear magnetic resonance and mass spectral analyses. Mass spectral analysis indicated the material to be a hydrocarbon of parent mass 108, with principal peaks at 93, 79, 67, 54, 41 and 27. The isotopic ratios of the parent +1 and the parent +2 ions check for the empirical formula $C_8H_{12}$. The observed Hydrogen Number for this material was 35.8; the calculated value for 1,3,7-octatriene is 36.06.

The nuclear magnetic resonance spectrum of 1,3,7-octatriene in $CHCl_3$ was as follows:

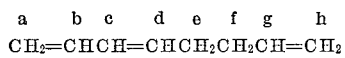

| | P.p.m. (from TMS) | Relative area |
|---|---|---|
| $H^{g,b}$ | 5.2–7.0 } | 4 |
| $H^{c,d}$ | 6.0 } | |
| $H^{a,h}$ | 4.8–5.2 | 4 |
| $H^{e,f}$ | 2.1–2.4 | 4 |

Infrared analysis showed the following bands assignable to the 1,3,7-structure: $6.09\mu$ (C=C, nonconjugated), $6.22\mu$ (C=C—C=O), 9.93, $10.98\mu$ (—CH=$CH_2$), $10.45\mu$ (—C=C—, conjugated trans). The characteristic methyl band at $7.25\mu$ was absent. These data are in essential agreement with those reported for trans-1,3,7-octatriene obtained by independent synthesis.

Trans-crotyl acetate.—Peak #3 was collected from distillation cuts #3 and #5. Identification was based on comparison of its infrared spectrum with that of known trans-crotyl acetate. This identification was substantiated by comparisons of vapor phase chromatograph retention time data of peak #3 with known trans-crotyl acetate.

Vinyl cyclohexene.—Peak #4 was collected from distillation cut #3. Identification was based on comparison of its infrared spectrum with that of an authentic sample of vinyl cyclohexene. This assignment was substantiated by vapor phase chromatograph retention time data. The identification was confirmed by comparison of the nuclear magnetic resonance spectrum of peak #4 with that of authentic 4-vinyl cyclohexene-1.

1,7-octadien-3-ol acetate.—Distillation cut #7 was determined to be 93.7 percent peak #12 by vapor phase chromatograph analysis. Infrared analysis of this material suggested the presence of a terminal vinyl group by a strong band at $6.09\mu$ and a pair of bands at 10.06 and $10.94\mu$. In addition, shoulders at 10.75 and $10.12\mu$ suggested the presence of an allylic substituted terminal vinyl group. Bands at 5.77 and $8.05\mu$ indicated that this was an acetate ester.

The nuclear magnetic resonance spectrum of 1,7-octadien-3-ol acetate in $CDCl_3$ was as follows:

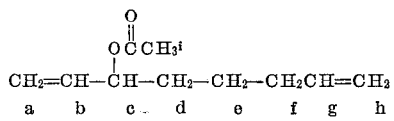

| | P.p.m. (from TMS) | Relative area |
|---|---|---|
| $H^{b,g}$ | 5.4–6.2 | 2 |
| $H^{a,h}$ | 4.75–5.17 | 4 |
| $H^f$ | 2.1 | 2 |
| $H^c$ | 5.25 | 1 |
| $H^{d,e}$ | 1.6 | 4 |
| $H^i$ | 2.0 | 3 |

Confirmation of the basic carbon skeleton was obtained on hydrogenation of material from cut #7; 3-octyl acetate (infrared, nuclear magnetic resonance) was produced.

Cis-2,7-octadien-1-ol acetate.—Distillation cut #10 was further separated by preparative gas chromatography on a 20′–20% polymetaphenyl ether was 60/80 mesh Chromosorb³ column at 162° C. From this, the compound corresponding to peak #17 was obtained in 93.9% purity. Infrared bands were found as follows (in microns): 3.24, =CH, =$CH_2$; 5.77, ester C=O; 6.05, internal cis C=C; 6.1, external vinyl; 8.1, ester C—O; 9.7, acetate; 10.08 and 10.95, —CH=$CH_2$; 13.7, cis —CH=CH—. All functional groups were consistent with the proposed structure.

The nuclear magnetic resonance spectrum of the material in $CHCl_3$ appeared as follows:

$$\underset{i}{CH_3}\overset{O}{\underset{\|}{C}}-\underset{a}{CH_2}-\underset{b}{CH}=\underset{c}{CH}=\underset{d}{CH_2}-\underset{e}{CH_2}-\underset{f}{CH_2}-\underset{g}{CH}=\underset{h}{CH}$$

| | P.p.m. (from TMS) | Relative area |
|---|---|---|
| $H^g$ | 5.3–6.2 } | 3 |
| $H^{b,c}$ | 5.3–6.2 } | |
| $H^h$ | 4.8–5.25 | 2 |
| $H^{d,f}$ | 2.1 | 4 |
| $H^a$ | 4.62 | 2 |
| $H^e$ | 1.48 | 2 |
| $H^i$ | 2.04 | 3 |

The mass spectral fragmentation pattern was consistent with the proposed structure and was almost identical with that of the corresponding trans-2,7-octadien-1-ol acetate. Nearly identical fragmentation patterns would be predicted for such esters differing only in the geometry of a single carbon-carbon double bond.

Mass spectral fragment intensities of cis- and trans-2,7-octadien-1-ol acetates expressed as percent of base peak.

| M/e | Cis- | Trans- | M/e | Cis- | Trans- |
|---|---|---|---|---|---|
| 126 | 1.72 | 2.17 | 70 | 2.85 | 2.77 |
| 108 | 3.36 | 3.59 | 69 | 1.05 | 1.01 |
| 95 | 1.06 | 1.08 | 68 | 3.08 | 2.91 |
| 93 | 8.54 | 7.84 | 67 | 27.49 | 24.18 |
| 91 | 1.20 | 1.05 | 66 | 5.33 | 5.27 |
| 84 | 1.67 | 1.57 | 65 | 1.97 | 1.67 |
| 83 | 2.54 | 2.44 | 57 | 3.29 | 3.20 |
| 82 | 6.05 | 6.02 | 55 | 12.15 | 12.66 |
| 81 | 2.72 | 2.73 | 54 | 20.53 | 19.60 |
| 80 | 6.94 | 6.52 | 52 | 1.1 | 1.02 |
| 79 | 10.84 | 10.17 | 51 | 1.89 | 1.71 |
| 78 | 1.29 | 1.21 | 44 | 2.62 | 2.55 |
| 77 | 1.86 | 1.59 | 43 | 100.00 | 100.00 |
| 71 | 1.43 | 1.55 | | | |

Trans-2,7-octadien-1-ol acetate.—Distillation as described above. The compound corresponding to peak #18 was obtained in 99+ percent purity. By infrared analysis, the following bands were observed (positions in microns): 3.25, =CH, =$CH_2$; 3.04 and 3.53, —$CH_2$—; 5.77, ester C=O; 6.0, internal trans C=C; 10.05 and 10.95, —CH=$CH_2$; 10.32, trans —CH=$CH_2$. All functional groups were consistent with the proposed trans structure.

The nuclear magnetic resonance spectrum of the material in $CDCl_3$ appeared as follows:

$$\underset{i}{CH_3}\overset{O}{\underset{\|}{C}}O-\underset{a}{CH}-\underset{b}{CH}=\underset{c}{CH}-\underset{d}{C_2H}-\underset{e}{CH_2}-\underset{f}{CH_2}-\underset{g}{CH}=\underset{h}{CH_2}$$

| | P.p.m. (from TMS) | Relative area |
|---|---|---|
| $H^g$ | 5.3–6.2 } | 3 |
| $H^{b,c}$ | 5.3–6.2 } | |
| $H^h$ | 4.8–5.25 | |
| $H^{d,f}$ | 2.1 | 4 |
| $H^a$ | 4.5 | 2 |
| $H^e$ | 1.48 | 3 |
| $H^i$ | 2.01 | |

³ Johns-Manville trademark for diatomaceous silica.

The mass spectrum of this compound was almost identical to that of the corresponding cis isomer. See listing of peaks under cis compound.

EXAMPLE 2

Octyl acetate by hydrogenation of trans-2,7-octadien-1-ol acetate

To a high-pressure bomb was charged 1.49 grams of fraction #11, Example 1, 0.40 gram of platinum on alumina, and 78 grams of pentane. Hydrogen was charged to 850 p.s.i.g. at 29° C. After 24 hours, the reaction mixture was filtered. Solvent was removed by distillation. An analytical sample was collected by preparative gas chromatography. The nuclear magnetic resonance and infrared spectra and the vapor phase chromatography retention time of the product of hydrogenation were identical to those of a known sample of n-octyl acetate.

EXAMPLE 3

Palladium chloride with potassium acetate

To a 3-l. glass bomb liner was charged 30 grams of lithium chloride, 1.00 gram of palladium chloride, 68.7 grams of potassium acetate, and 300 grams of acetic acid. The liner and its contents were placed in a high-pressure bomb and purged with nitrogen. Butadiene (114 grams) was charged. The mixture was heated at 90° C. for 15 hours.

A clear, yellow solution and white precipitate was obtained. There was no observable deposition of metallic palladium.

The mixture was combined with 1-l. of water, then extracted with pentane. The combined pentane extracts were washed with sodium bicarbonate solution, dried over Drierite [4], then stripped to give 7.6 grams of residue. The distribution of products in the residue is given below:

| Product | Percentage by weight |
|---|---|
| C—C—C=C<br>$\|$<br>OAc | 8.3 |
| C=C—C=C—C—C—C=C | 5.0 |
| C—C=C—C—OAc | 1.8 |
| 4-vinyl-1-cyclohexene | 46.2 |
| OAc<br>$\|$<br>C=C—C—C—C—C—C=C | 4.1 |
| cis-AcO—C—C=C—C—C—C—C=C | 2.2 |
| trans-AcO—C—C=C—C—C—C—C=C | 12.0 |
| Unidentified | Balance |

[4] Anhydrous calcium sulfate.

These results show that palladium chloride, even in the presence of acetate ion, is distinctly less preferred, since only low yields of the octadienyl acetates are obtained. In the absence of acetate ion, none of the octadienyl acetates are observed with palladium chloride.

EXAMPLE 4

Comparison of results obtained in presence of copper acetate

To a 3-l. bomb liner was charged 48.0 grams of copper acetate, 45.9 grams of lithium acetate, 68.7 grams of potassium acetate, 600 grams of palladium acetate and 300 grams of acetic acid. The mixture was charged to a bomb, purged with nitrogen, then 107 grams of butadiene were added. Heating at 95–102° C., was continued for 17 hours. After reaction, the mixture was a homogeneous brown-green liquid.

Ascorbic acid titration for copper(II) in the reaction mixture showed 0.076 and 0.069 meq./g.; copper(II) initially present, 0.506 meq./g.

The product was extracted from the reaction mixture as described in Example 1 to give 44.5 grams of material which would distill up to 79°/4 mm. and 20.2 grams of pot residue. The product distribution from the distillate is given below:

| Product | Percentage by weight |
|---|---|
| C—C—C=C<br>$\|$<br>OAc | 23.5 |
| C=C—C=C—C—C—C=C | 4.4 |
| C—C=C—C—OAc | 24.8 |
| 4-vinyl-1-cyclohexene | 16.6 |
| OAc<br>$\|$<br>C=C—C—C—C—C—C=C | 3.3 |
| cis-AcO—C—C=C—C—C—C—C=C | 7.6 |
| trans-AcO—C—C=C—C—C—C—C=C | 6.1 |
| Unidentified | Balance |

The conditions of this example for comparison are similar to those reported in U.S. Pat. No. 3,221,045, except that no oxygen was present. Under these conditions, the principle products are the unsaturated butenyl acetates reported above.

EXAMPLE 5

Comparison of results in absence of palladium

Example 4 was repeated except that no palladium acetate was present. The only dimeric product observed was 1.4 grams of 4-vinyl-1-cyclohexene.

EXAMPLE 6

Palladium acetate in absence of alkali metal acetate

In the same manner as described above, 1.00 gram of palladium acetate, 300 grams of acetic acid, and 89 grams of butadiene were allowed to react at 85–92° C. for 17 hours. The mixture obtained was clear amber with some black precipitate and metallic mirror present. The mixture was added to 1-l. of water and extracted with pentane to give 27.4 grams of product mix. The distribution of products is given below:

| Product | Percentage by weight |
|---|---|
| C—C—C=C<br>$\|$<br>OAc | 16.2 |
| C=C—C=C—C—C—C=C | 5.5 |
| C—C=C—COAc | 16.0 |
| 4-vinyl-1-cyclohexene | 5.0 |
| OAc<br>$\|$<br>C=C—C—C—C—C=C | 14.8 |
| cis-AcO—C—C=C—C—C—C=C | 3.0 |
| trans-AcO—C—C=C—C—C—C=C | 38.9 |

These results show that the presence of alkali-metal acetate is preferred to obtain higher yields of the desired octadienyl acetates, although paladium acetate alone is an effective catalyst as compared to Examples 3 and 4.

EXAMPLE 7

Isoprene and palladium acetate

To a 3-l. glass bomb liner was charged 45.9 grams of lithium acetate, 68.7 grams of potassium acetate, 1.00 gram of palladium acetate, 300 grams of acetic acid and 100 grams of isoprene. The mixture was heated in a bomb at 95–99° C. for 20 hours. Extraction with pentane gave 24.4 grams of crude products. Products identified in the mixture included acetic acid addition products analogous to those obtained with butadiene.

EXAMPLE 8

Palladium with phosphine ligands (A) The catalyst used was palladium acetylacetonate modified with triphenyl phosphine in a molar ratio of P/Pd of 1 to 1. As previously described, butadiene was reacted with acetic acid in the presence of this catalyst at 90° C. for approximately 16 hours. The conversion of butadiene was about 45%, and product distribution was butenyl-1-acetate 5%, butenyl-3-acetate 14%, octadienyl-1-acetate 47%, octadienyl-3-acetate 17%, and octatriene 15%.

(B) When the above experiment was repeated with benzoic acid in the presence of acetone solvent, and at a temperature of 95° C., the butadiene conversion was 80%. The product distribution was octadienyl-1-benzoate 40.7%, octadienyl-3-benzoate 22.6%, and octatriene 36.7%.

(C) The above experiment was repeated with undecenoic acid, using a similar catalyst except that the P/Pd ratio was 2 to 1. The reaction temperature was 75° C., and the reaction time was approximately 16 hours. The product distribution was octadienyl-1-undecenoate 16%, octadienyl-3-undeconate 11%, and octatriene 73%.

EXAMPLE 9

Platinum with phosphine ligands

Platinum acetylacetonate (0.25 mmole) and triphenylphosphine (0.25 mmole) were charged to a small Pyrex reaction tube along with 10 milliliters of butadiene and 10 milliliters of acetic acid. The tube was capped, then heated at 90–95° C. on a steam bath for 20 hours, during which time 37 percent of the butadiene charged was converted to products. The products observed were 1,3,7-octadiene, 17.6%; 3-butene-2-ol acetate, 10.7%; 2-buten-1-ol acetate, 6.12%; 1,7-octadiene-3-ol acetate, 11.3%; and 2,7-octadiene-1-ol acetate, 49.5%.

What is claimed is:

1. Process for converting 1,3-conjugated acylic diolefins of the group consisting of butadiene, isoprene, piperylene and 1,3-hexadiene to diolefinic esters having twice the number of carbon atoms in the diolefinic alcohol residue of the ester as the starting diolefin, which consists essentially in reacting said diolefin with a carboxylic acid in the presence of a palladium carboxylate and an alkali-metal carboxylate and in the absence of a catalytic co-oxidant, said carboxylic acid being selected from the group consisting of hydrocarbon aliphatic and aromatic mono- and dicarboxylic acids recovering said diolefinic ester from the reaction product.

2. Process as claimed in claim 1 in which the diolefin is butadiene, the carboxilic acid is acetic acid, the carboxylate is acetate, and the diolefinic ester is an octadienyl ester.

3. Process for converting 1,3-conjugated acylic diolefins of the group consisting of butadiene, isoprene, piperylene and 1,3-hexadiene to diolefinic esters having twice the number of carbon atoms in the diolefinic alcohol residue of the ester as the starting diolefin, which consists essentially in reacting said diolefin with a carboxylic acid in the presence of a palladium or platinum catalyst complexed with a compound selected from the group consisting of trihydrocarbyl phosphines, phosphites and arsines, said carboxylic acid being selected from the group consisting of hydrocarbon aliphatic and aromatic mono- and dicarboxylic acids, and recovering said diolefinic ester from the reaction products.

4. Process as claimed in claim 3 in which the phosphine is a triaryl phosphine.

5. Process as claimed in claim 3 in which the phosphine is triphenyl phosphine.

6. Process as claimed in claim 3 in which the catalyst is palladium and the molar ratio of the complexed compound to palladium is from 200 to 1 to 1 to 10.

7. Process as claimed in claim 3 in which the catalyst is palladium and the molar ratio of the complexed compound to palladium is from 100 to 1 to 1 to 1.

8. Process as claimed in claim 3 in which the diolefin is butadiene.

References Cited

UNITED STATES PATENTS

| 3,221,045 | 11/1965 | McKeon et al. | 260—497 |
| 3,407,224 | 10/1968 | Smutny | 260—497 |
| 3,394,170 | 7/1968 | Kohll | 260—497 |

OTHER REFERENCES

Kochi et al., J. Org. Chem., v. 30, June, 1965, p. 1872.

LORRAINE A. WEINBERGER, Primary Examiner

V. GARNER, Assistant Examiner

U.S. Cl. X.R.

260—31.8, 410.9, 468, 469, 471, 475, 476, 480, 485, 486, 487, 488, 489, 597, 632, 638, 666, 683.15